Feb. 17, 1942.    J. H. TEAF    2,273,499
MECHANICAL TUNING MECHANISM
Filed Feb. 4, 1938    5 Sheets-Sheet 1

INVENTOR
John H. Teaf
BY
A. D. T. Libby
ATTORNEY

Feb. 17, 1942.                J. H. TEAF                 2,273,499
                    MECHANICAL TUNING MECHANISM
                       Filed Feb. 4, 1938          5 Sheets-Sheet 2
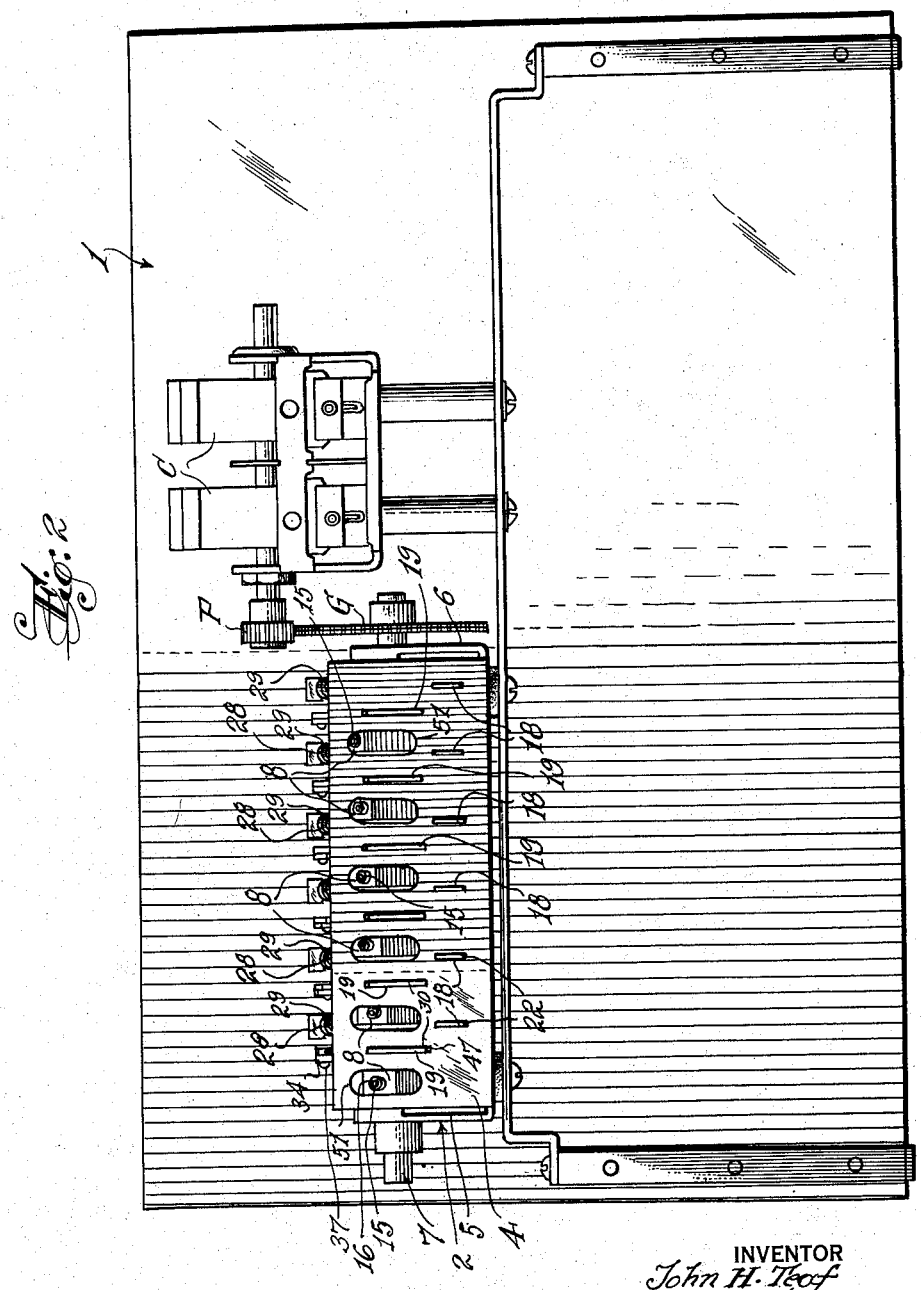
INVENTOR
John H. Teaf
BY
A. D. T. Libby
ATTORNEY Feb. 17, 1942.   J. H. TEAF   2,273,499
MECHANICAL TUNING MECHANISM
Filed Feb. 4, 1938    5 Sheets-Sheet 3
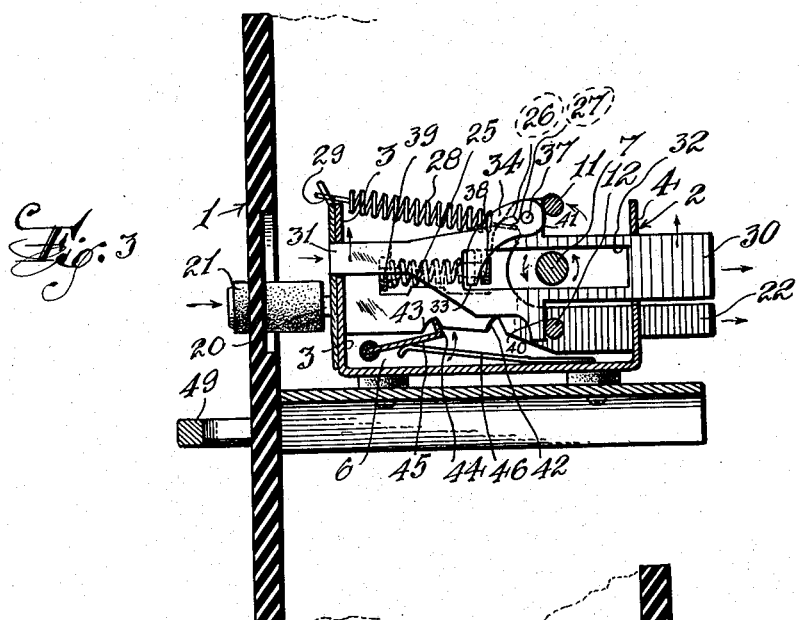
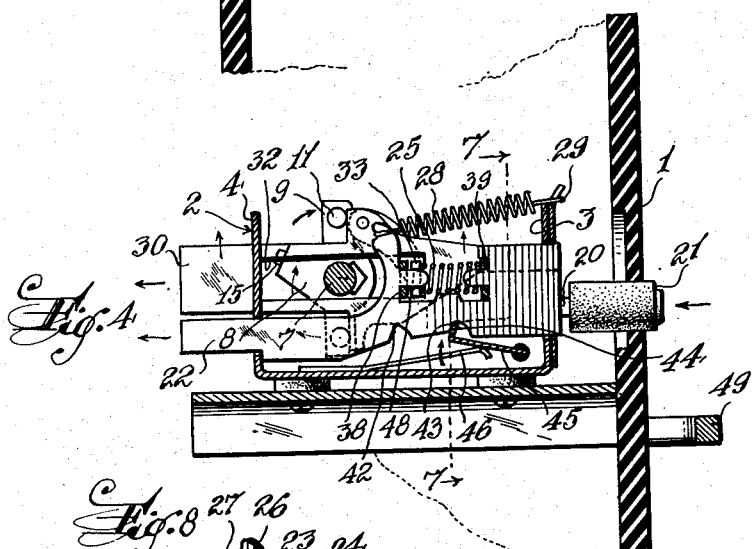
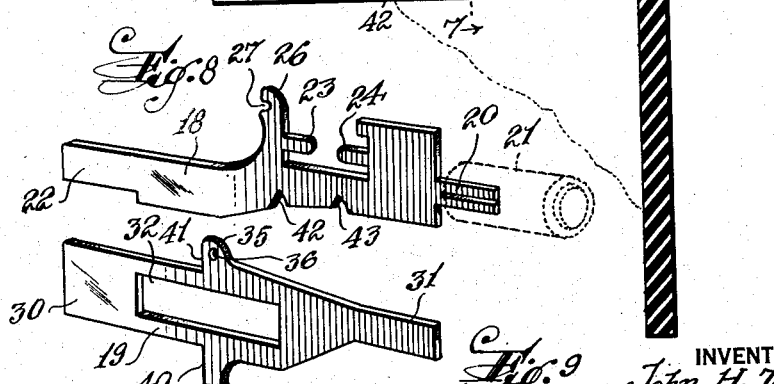
INVENTOR
John H. Teaf
BY
A. D. T. Libby
ATTORNEY Feb. 17, 1942.  J. H. TEAF  2,273,499
MECHANICAL TUNING MECHANISM
Filed Feb. 4, 1938  5 Sheets-Sheet 4
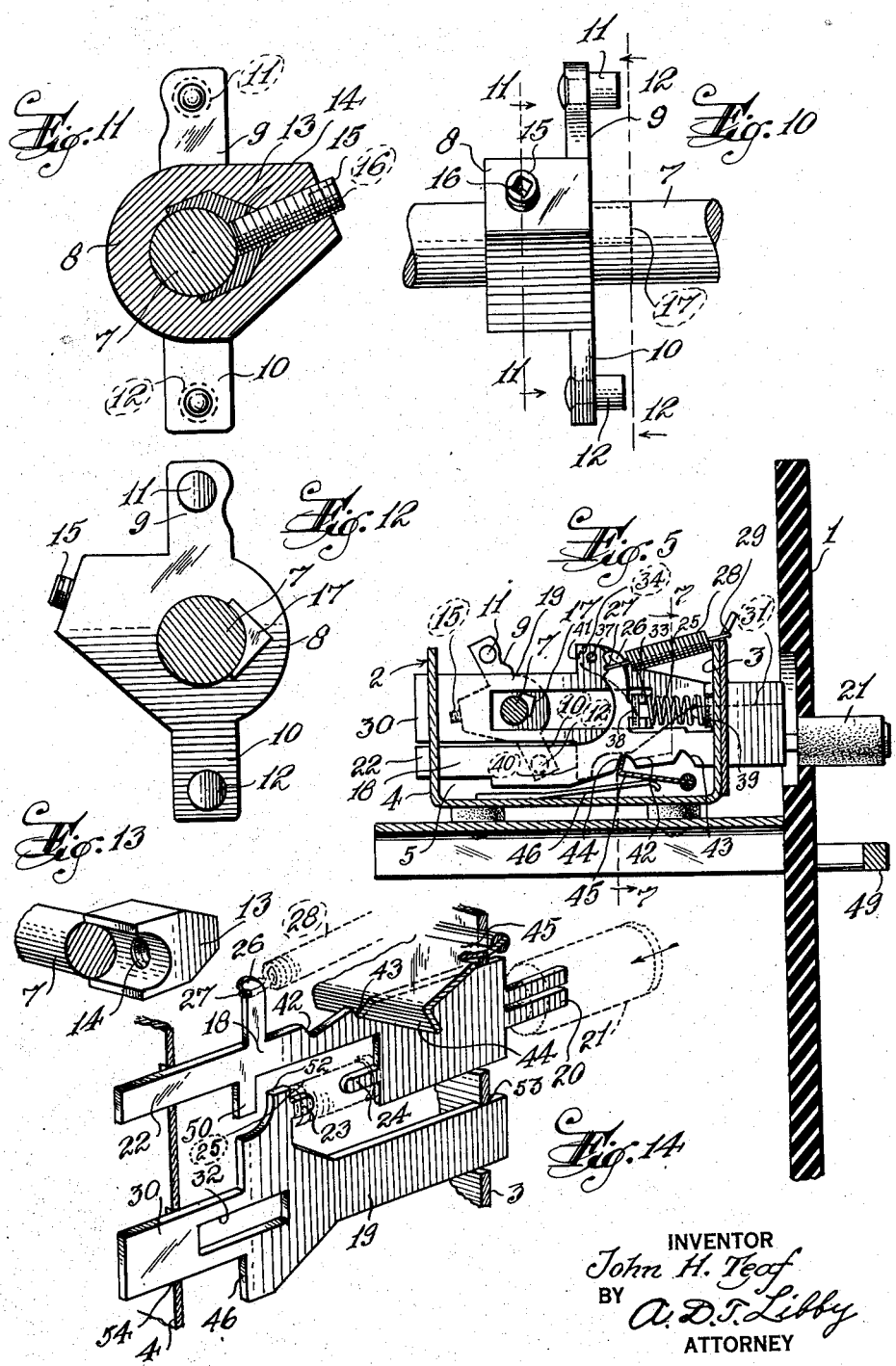

Feb. 17, 1942.                J. H. TEAF                2,273,499
              MECHANICAL TUNING MECHANISM
                  Filed Feb. 4, 1938           5 Sheets-Sheet 5

INVENTOR
John H. Teaf
BY
A. D. J. Libby
ATTORNEY

Patented Feb. 17, 1942

2,273,499

UNITED STATES PATENT OFFICE 2,273,499

MECHANICAL TUNING MECHANISM

John H. Teaf, Moorestown, N. J., assignor, by mesne assignments, to Condenser Development Corporation, Newark, N. J., a corporation of New Jersey Application February 4, 1938, Serial No. 188,640

24 Claims. (Cl. 74—10)

This invention relates to a mechanical tuning mechanism especially adapted for use in connection with radio receiving sets.

There are many people who cannot properly tune in various stations which appear on the dial or associated parts of a receiving set. Likewise, it is more desirable to eliminate the necessity of searching the dial by back and forth turning of a knob to obtain the accurate resonance point.

It also happens that many people tune in only on a few stations comprising those whose programs appeal to them, and therefore they prefer to have a receiving set so constructed that these particular stations may be quickly selected and accurately tuned.

Certain mechanisms have been proposed for this kind of work, but the mechanical devices with which I am familiar are quite complicated and consequently expensive to manufacture, and more or less difficult to maintain. The mechanisms known to me have minute inaccuracies in positioning the tuning element, resulting in slight errors in tuning from true resonance. These errors are due to play in bearings, lost motions due to construction and as a result of slight unavoidable sidewise pressure on the buttons or levers by the operator.

It is therefore the principal object of my present invention to provide a manually-operated mechanism for automatically tuning a radio receiving set to a plurality of stations which may be selected to suit the owner or user of the set.

A further object of my invention is to provide a mechanical mechanism for actuating the tuning element of a receiving set which is relatively simple, yet rigid in its construction and accurate in its method of operation.

A further object of my invention is to provide a tuning mechanism having a plurality of pre-setting buttons which, when operated to tune in any chosen station, will maintain the set position with accuracy against extraneous forces, such as jarring or moving the radio set which would act to release the setting and detune the set.

Another object of my invention is to provide a mechanical structure for the main purpose described, which has means for eliminating all back-lash in the mechanism, regardless of the clearances which may be the result of selection or inaccuracy in manufacture.

Another object of my invention is to provide such a device that will perform properly regardless of the manner in which the buttons are pushed; for example, a slight oblique pressure of the fingers will not act to give a different result than a straight axial pressure on the buttons.

Much consideration has been given to the problem of ease in pushing the buttons. It has been difficult to push buttons on a light-weight receiver because the action tends to move the cabinet on its table or support, requiring the operator to hold the cabinet with his other hand. To overcome this, it has been proposed to either mount the buttons on top of the cabinet and press down on them toward the table, or to have an oblique front panel so that the cabinet would not move. It is therefore another object of my invention to provide a unique means to aid in pushing the buttons on any type of push-button-operated receiver, regardless of the position of the buttons on the exterior of the cabinet.

These and other objects will be clear to one skilled in these matters, on reading the following specification taken in connection with the annexed drawings, wherein:

Figure 2 is a rear elevation of my improved tuning mechanism as applied to a tuning device, such as a condenser.

Figure 3 is a part-sectional and part-elevational view on the line 3—3 of Figure 1.

Figure 4 is a part-sectional and part-elevational view on the line 4—4 of Figure 1.

Figure 5 is a view on the line 5—5 of Figure 1.

Figure 8 is a perspective view of the push-button bar comprising part of a slidable unit utilized for selecting a given radio station.

Figure 9 is a perspective view of the actuating bar associated with the push-button bar of Figure 8 and making up the slidable unit.

Figure 10 is a plan view of an adjustable device carried by the main operating shaft for cooperation with the actuating bar of a slidable unit.

Figure 11 is a view on the line 11—11 of Figure 10.

Figure 12 is a view on the line 12—12 of Figure 10.

Figure 13 is a perspective view on a reduced scale of the saddle-type clamping member shown in Figure 11.

Figure 14 is a perspective view showing a modified form of arrangement of the slidable unit.

Figure 1:
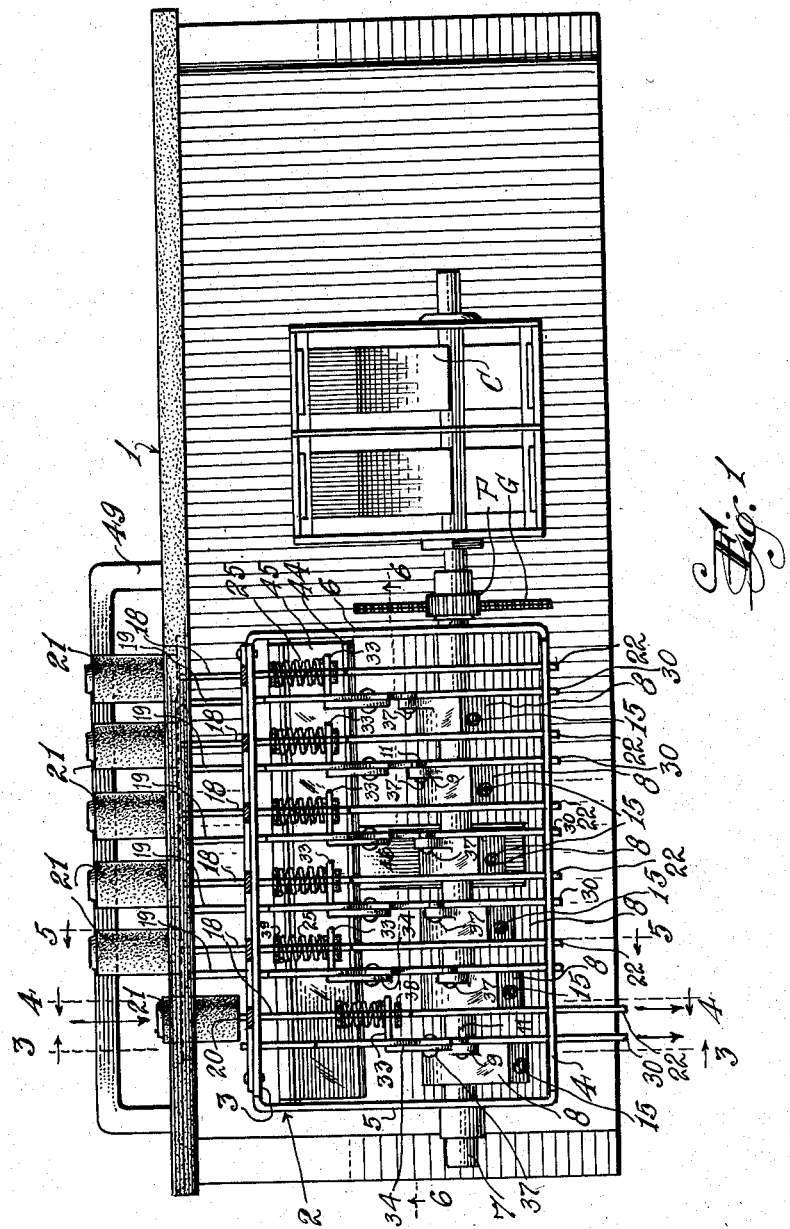
Figure 1 is a plan view of a portion of a receiving set or apparatus to which my invention may be applied.
Figure 6:
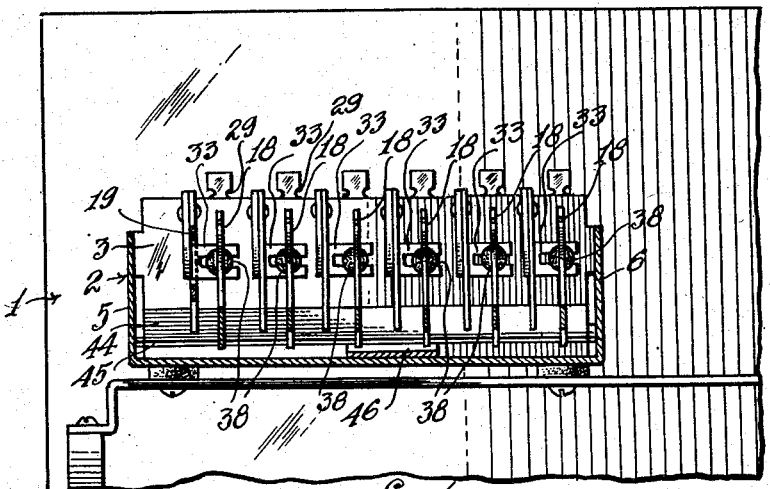
Figure 6 is a view on the line 6—6 of Figure 1.
Figure 7:
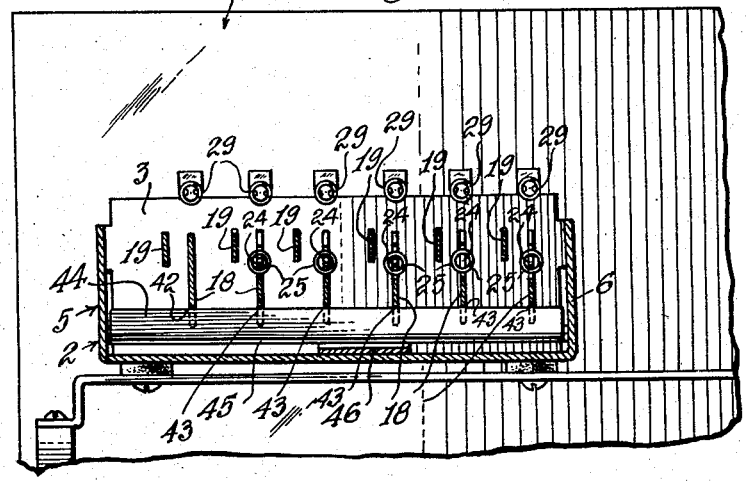
Figure 7 is a view on the line 7—7 of Figure 4.

Referring now to the details, wherein like numbers refer to corresponding parts in the various views, 1 illustrates the front panel of a radio receiving set, in back of which, and within the set, is mounted, with the exception of the push-buttons per se, my mechanical tuning mechanism which is mounted in a frame 2 having front and back sides or integral portions 3 and 4, joined by end plates 5 and 6, between the latter of which is supported, in any satisfactory manner, a rotatable shaft 7. Carried on the shaft 7, are a plurality of devices 8, a description of one of which will apply to all. The device 8 has a pair of projections 9 and 10 preferably diametrically positioned.

Securely fastened, as by riveting, welding or otherwise, to the arm 9, is a pin or projection 11, and to the portion 10, a pin or projection 12. The device 8 is so formed as to receive a stirrup or saddle-shaped member 13 having its sides extending around and engaging the major part of the periphery of the shaft 7. The saddle 13 has a tapped hole 14 to receive a set screw 15 which is preferably made with a socket 16 to receive a special wrench, so that it cannot be tampered with by an ordinary screw driver. The set screw 15 passes through the member 8 and saddle 13 into engagement with the shaft 7 to lock the device 8 in any position to which it may be turned on the shaft 7.

To increase the area of contact of the device 8 with the shaft 7, I may provide the device 8 with a projecting lug 17 having its inner surface arcuately formed to the curvature of the shaft 7, thereby providing a relatively long bearing on the shaft 7 to prevent side-wobble of the member 8. The device 8 may be termed a walking-beam lever whose functions will be later decribed, in connection with the slidable units which cooperate therewith.

A description of one of the slidable units will serve for all. The slidable unit is composed of two bars, a push-button bar 18 and an actuating bar 19. The bar 18 has one end, 20, adapted to pass through a slot in the member 3 and through the panel 1 to receive a push-button 21. As shown, the projecting part 20 is slit so it may be spread to provide a gripping engagement with the push-button 21. As no pull is ever required on the button 21, little force is required to hold it in position on the projection 20, it being understood that the button 21 is formed with a rectangular-shaped slot to receive the projecting part 20. The end 22 of the member 18 projects through and is slidable in a slot in the frame member 4. The bar 18 is provided with a pair of tongues 23 and 24 for positioning or locating a spring 25 which is relatively stiff for the purpose to be hereinafter pointed out. A lug 26 on the bar 18 has a notch 27 therein to receive one end of a spring 28, the opposite end of which is attached to a clip or finger 29 fastened to or forming part of the frame member 3. The spring 28 is used as a return spring for returning the bar members to their normal inoperative position.

The actuating bar 19 has one end 30 slidably positioned in a slot in the frame member 4, while the opposite end 31 is slightly offset from the plane of the end 30 and is positioned to slidably move in the frame member 3. The bar 19 has an opening 32 therein to receive the bent end 33 of a lever 34, which lever is pivoted to a lug 35 through the medium of a hole 36 adapted to receive a pin 37 therein. The bent end 33 of the lever 34 is preferably slotted to fit over the tongue 23 of the bar 18, and is engaged by the spring 25. Also located on the tongue 23, in back of the end 33 of the lever 34, is a washer 38 preferably of sound-deadening material such as fiber. On the opposite end of the spring 25, and on the tongue 24, is likewise positioned a similar washer 39.

The actuating bar 19 is provided with abutments 40 and 41 which are adapted to engage the pins 12 and 11, respectively, as the levers 18 and 19 are operated in the manner to be presently described. The bar 18 is provided with two notches 42 and 43 which are adapted to be engaged by the bent-over edge 44 of a lever 45 pivotally mounted between the frame members 5 and 6. The locking lever or bar 45 is continuously acted on by a spring 46 to push it into engagement with the bottom of the bars 18 and the notches 42 and 43, as will be later described.

In the operation of my mechanical tuning mechanism, a push on one of the buttons 21, for example the left-hand one shown in Figure 1, moves the bar 18 rearwardly and, through the medium of the spring 25 acting on the bent end 33 of the lever 34, the actuating bar 19 is likewise moved rearwardly until one of the abutments 40 or 41 engages one of the pins 12 or 11, respectively, depending on the setting of the device 8 on the shaft 7. It is to be understood that the spring 25 is stiff enough so that it will carry the bar 19 rearwardly without changing its relative length.

As soon as one of the abutments 40 or 41 hits one of the aforesaid pins, the member 8 and shaft 7 are rotated until the other pin hits its associated abutment, at which time the rearward movement of the bar 19 is stopped. In this position, the tuning element, for example a condenser C, which is shown as a two-gang type, has its movable element, such as the rotor, moved to tune the circuit controlled thereby, through the medium of the pinion P and laminated gear G, of the anti-back-lash type, which is securely fastened to the shaft 7 and gives a four-to-one reduction between the shaft 7 and the shaft of the rotating part of the tuning device C, so that the shaft 7, according to the construction herein described, is only required to move through an angle of 45° to get a 180° movement of the movable element of the condenser C.

Now, in order to take out all back-lash and to hold the parts in the tuned position, the movement of the push-button 21 is continued a short distance rearwardly, which act causes the lever 33, through the spring 25, to apply a force the resultant of which acts upwardly on the actuating bar 19, forcing it against the upper portions of the slots in the side members 3 and 4, carrying this bar, leaving a slight clearance 47 (see Figure 2) at the point indicated at both ends of the bar. This movement also produces a slight clearance 48 between the end 33 of the toggle lever and the washer 38, as will be seen in Figures 1 and 4.

Co-incident with this last movement of the bar 18, the edge 44 of the locking lever 45 moves into the notch 43, thereby locking the slidable unit, composed of the bars 18 and 19, in its final actuated tuning position, and jarring or moving of the set, or other ordinary disturbances, will not release or destroy the setting which has previously been predetermined by setting the individual adjustable device 8 on the shaft 7 in the position corresponding to a certain wave-length or frequency of the stations chosen to be tuned in by this mechanism. The different positions of the adjustable devices 8 are indicated more or less as they would appear in practice, in Figure 1.

When it is desired to tune in some other station, another one of the buttons 21 is pushed, the first rearward movement of which releases the button that is already locked, by reason of the fact that the edge 44 of the locking lever 45 is in the notches 42 of the other bars 18, so that movement of another one of these bars, through the medium of the cooperating surface of the notch 42, will move the locking lever 45 so as to release it from the notch 43 of the station unit that was previously held in locked position.

Also, it will be understood that when it is desired to release any button from its locked position, this may be done by pushing one of the other buttons a certain amount without carrying the movement far enough to lock another station in.

Also, it will be readily seen that any one of buttons may be pushed and the tuning element, such as the rotor of the condenser C, will be moved through the medium of the device 8 on the shaft 7 engaging the pins 11 and 12 in the manner heretofore described, so that the shaft 7 is rotated either to the right or left, depending on what button is pushed.

As has been stated, the adjustment of the walking-beam lever 8 is accomplished through the medium of the special set screw 15, slots or openings 51 being provided in the side plate 4 through which the adjusting set screws 15 may be reached.

To assist the operator in pushing the buttons 21, a finger grip in the form of a rail 49 is attached to the panel 1. The fingers of the operator are passed around the rail 49 to grip the same, and the thumb is then passed into engagement with the buttons 21. In this way the push-and-pull forces are equalized and there is no tendency to move or disturb the cabinet of the radio set.

In Figure 14 I have shown, somewhat diagrammatically, a modified form of arrangement of the bars 18 and 19, they being positioned one above the other, instead of substantially side by side as in the forms previously described. In Figure 14 it will be noted that the bar 18 as a projection 50 which is adapted to engage a shoulder 52 on the bar 19 to return this to normal position through the medium of the spring 28 acting on the bar 18. A further distinction in this form is that when the final push is given to the bar 18, this causes the bar 19 to oscillate about a center in the plane of the pins 11 and 12 of the lever 8 which engage the abutments 41 and 40 as heretofore described, thus causing the lever 19 to engage the positive stops 53 and 54 in the side members 3 and 4, thereby accomplishing the same result as in the arrangement heretofore described, wherein the bar 19 is moved laterally against its fixed stops for the purposes described.

From this it will be seen that the details for carrying out my invention may be varied without departing from the spirit thereof or the scope of the appended claims.

What I claim is:

1. For a radio receiving set having a tuning device with a movable part for tuning circuits therein, means for operating said movable part of the tuning device including; a frame carrying a rotatable shaft adapted to be connected to said movable part of the tuning device, a plurality of longitudinally slidable units carried by the frame for turning the shaft and each unit corresponding to a radio station desired to be selected, each unit having shaft-turning engaging parts, and an adjustable device, one for each slidable unit carried on said shaft, each device having turning and positive stopping engagement parts on diametrically opposite sides of its axis adapted to be acted on by the engaging parts of its cooperative unit for turning the shaft in either direction of rotation and definitely stopping the shaft in a fixed position from any previously set position, depending on the station desired, as defined by the adjustment of said device.

2. For a radio receiving set having a tuning device with a movable part for tuning circuits therein, means for operating said movable part of the tuning device including; a frame carrying a single rotatable shaft adapted to be connected to said movable part of the tuning device, a plurality of longitudinally slidable units for turning the shaft mounted transversely of the frame at right angles to the shaft, each unit comprising a bar having a push-button thereon corresponding to a chosen radio station, and an actuating bar with means for operatively interconnecting the two bars, the actuating bar having engaging parts on opposite sides of its longitudinal axis and a device for each given station, adjustably carried on the shaft, said device having engagement parts on diametrically opposite sides of its axis adapted to be acted on by the engaging parts on said actuating bar to turn the shaft in either direction of rotation from any former set position, and stop it in a position predetermined by the adjustment of said device.

3. For a radio receiving set having a tuning device with a movable part for tuning circuits therein, means for operating said movable part of the tuning device including; a frame carrying a rotatable shaft adapted to be connected to said movable part of the tuning device, a plurality of slidable units carried by the frame and each unit corresponding to a radio station desired to be selected, each slidable unit comprising a push-button bar and an actuating bar operatively connected and an adjustable device, one for each slidable unit, carried on said shaft, said adjustable device having a pair of oppositely extending portions with a projection protruding from each, the actuating bar having oppositely disposed shoulders to engage said projections to turn the shaft in a direction determined by which projection is first encountered by one of said shoulders.

4. For a radio receiving set having a tuning device with a movable part for tuning circuits therein, means for operating said movable part of the tuning device including; a frame carrying a rotatable shaft adapted to be connected to said movable part of the tuning device, a plurality of slidable units carried by the frame and each unit corresponding to a radio station desired to be selected, each slidable unit comprising a push-button bar and an actuating bar operatively connected and an adjustable device, one for each slidable unit, carried on said shaft, said adjustable device having a pair of oppositely extending portions with a projection protruding from each, the actuating bar having oppositely disposed shoulders to engage said projections to turn the shaft in a direction determined by which projection is first encountered by one of said shoulders, and a lever joint resiliently connected between the push-button bar and the actuating bar to move the actuating bar to a final rigid position on the last part of movement of the push-button bar, and means for locking the bars in this final position.

5. For a radio receiving set having a tuning device with a movable part for tuning circuits therein, means for operating said movable part of the tuning device including; a frame carrying a rotatable shaft adapted to be connected to said movable part of the tuning device, a plurality of slidable units carried by the frame and each unit corresponding to a radio station desired to be selected, each slidable unit comprising a push-button bar and an actuating bar operatively connected and an adjustable device, one for each slidable unit, carried on said shaft, said adjustable device having a pair of oppositely extending portions with a projection protruding from each, the actuating bar having oppositely disposed shoulders to engage said projections to turn the shaft in a direction determined by which projection is first encountered by one of said shoulders, the second-engaged projection acting as a final stop for the actuating bar, and a resilient connection between the push-button bar and the actuating bar serving to move, by the final movement of the push-button bar, the actuating bar after it has been stopped by said projections against fixed stops, and means for locking the bars in this final position.

6. For a radio receiving set having a tuning device with a movable part for tuning circuits therein, means for operating said movable part of the tuning device including; a frame carrying a rotatable shaft adapted to be connected to said movable part of the tuning device, a plurality of units one for each station desired to be selected and each composed of two flat bars, one a push bar and the other an actuating bar arranged and mounted on the frame to move transversely to said shaft, and having a yielding operative connection between the bars, the push bar of the unit having means including said operative connection for moving both bars, means for each unit carried by the shaft for turning it and adjustable on the shaft according to the station desired to be selected, and means on the actuating bar of each unit for engaging said adjustable means.

7. For a radio receiving set having a tuning device with a movable part for tuning circuits therein, means for operating said movable part of the tuning device including; a frame carrying a rotatable shaft adapted to be connected to said movable part of the tuning device, a plurality of units each composed of two flat bars arranged and mounted on the frame to move transversely to said shaft, and having an operative connection between the bars, one bar of the unit having means including said operative connection for moving both bars, a member for each unit adjustably carried on the shaft and having two oppositely extending portions with a pin in each, said second bar having means for engaging said pins, one at a time, to turn the shaft, the transverse movement of the second bar being stopped on engaging the second pin, fixed stops for said second bar and means for moving said second bar to engage said fixed stops, and means for locking the bars in their final actuated position.

8. For a radio receiving set having a tuning device with a movable part for tuning circuits therein, means for operating said movable part of the tuning device including; a frame carrying a rotatable shaft adapted to be connected to said movable part of the tuning device, a plurality of slidable units carried by the frame and each unit corresponding to a radio station desired to be selected, each slidable unit comprising a push-button bar and an actuating bar operatively connected together by a relatively stiff resilient member, and a member for each unit adjustably carried on the shaft for completing an operative connection between said shaft and the actuating bar.

9. For a radio receiving set having a tuning device with a movable part for tuning circuits therein, means for operating said movable part of the tuning device including; a frame carrying a rotatable shaft adapted to be connected to said movable part of the tuning device, a plurality of slidable units carried by the frame and each unit corresponding to a radio station desired to be selected, each slidable unit comprising a push-button bar and an actuating bar, the actuating bar being moved to tuning position by the push-button bar through the medium of a relatively stiff compression spring, and a lever pivoted on the actuating bar and extending into operative position with respect to said spring, and a member for each unit adjustably carried on the shaft for completing an operative connection between said shaft and the actuating bar.

10. For a radio receiving set having a tuning device with a movable part for tuning circuits therein, means for operating said movable part of the tuning device including; a frame carrying a rotatable shaft adapted to be connected to said movable part of the tuning device, a plurality of slidable units carried by the frame and each unit corresponding to a radio station desired to be selected, each slidable unit comprising a push-button bar and an actuating bar operatively connected together by a relatively stiff resilient member, and a member for each unit adjustably carried on the shaft for completing an operative connection between said shaft and the actuating bar, means for giving the actuating bar a last final movement to eliminate all back-lash in the connection between said frame, bar and shaft, and means for locking the unit bars in the final movement position.

11. For a radio receiving set having a tuning device with a movable part for tuning circuits therein, means for operating said movable part of the tuning device including; a frame carrying a rotatable shaft adapted to be connected to said movable part of the tuning device, a plurality of slidable units carried by the frame and each unit corresponding to a radio station desired to be selected, each slidable unit comprising a push-button bar and an actuating bar operatively connected together by a relatively stiff resilient member, and a member for each unit adjustably carried on the shaft for completing an operative connection between said shaft and the actuating bar, a lever connected between the actuating bar and the push-button bar through said resilient member for moving the actuating bar, after it has been moved to complete the operative connection with said member on the shaft, to remove all back-lash in the established connection, and means for locking the unit bars in this final position, said lock being released on pushing another push-button toward its tuning position.

12. For a radio receiving set having a tuning device with a movable part for tuning circuits therein, means for operating said movable part of the tuning device including; a frame carrying a rotatable shaft adapted to be connected to said movable part of the tuning device, a plurality of slidable units carried by the frame and each unit corresponding to a radio station desired to be selected, each slidable unit comprising a push-button bar and an actuating bar operatively connected and an adjustable device, one for each slidable unit, carried on said shaft for completing an operative connection between said shaft and the actuating bar, the said frame being adapted to be mounted in the receiving set so the push-buttons on their respective bars are positioned in a row on an exterior panel of the set, and means on said panel adjacent said row of buttons to act as a finger grip to assist in operating the buttons without tending to move or disturb the set.

13. For a radio receiving set having a tuning device with a movable part for tuning circuits therein, means for operating said movable part of the tuning device including; a frame carrying a rotatable shaft adapted to be connected to said movable part of the tuning device, a plurality of slidable units carried by the frame and each unit corresponding to a radio station desired to be selected, each slidable unit comprising a push-button bar and an actuating bar operatively connected and an adjustable device, one for each slidable unit, carried on said shaft for completing an operative connection between said shaft and the actuating bar, the said frame being adapted to be mounted in the receiving set so the push-buttons on their respective bars are positioned in a row on an exterior panel of the set, and a finger grip rail mounted on the panel adjacent to and in proximity with the row of buttons, as and for the purpose described.

14. In a radio receiving set, the combination of a movable tuning element, a structure having a shaft, with means for attachment to the moving element, a plurality of manually slidably operated bar units composed of two spring-and-lever connected members comprising part of said structure, and each unit associated with a chosen radio-sending station and adapted, when fully moved, to turn said shaft, and means for each unit completing the connection between the station bar units and the shaft, and rotatably adjustable on the shaft for determining the position which the tuning element will take on full movement of each bar unit.

15. In a radio receiving set, the combination of a movable tuning element, a structure having a shaft, with means for making a driving connection to the moving element, a plurality of manually operated bar units comprising part of said structure, and each unit associated with a chosen radio-sending station and adapted, when fully moved, to turn said shaft, and means for each unit completing the connection between the station bar units and the shaft, and rotatably adjustable on the shaft for determining the position which the tuning element will take on full movement of each bar unit, means for taking out all back-lash on the final movement of a bar unit, and means for locking the bar unit in the final position, the lock being released on movement of another bar toward tuning position.

16. In radio receiving set, the combination of a movable tuning element, a structure having a shaft, with means for attachment to the moving element, a plurality of manually operated bar units comprising part of said structure, and each unit associated with a chosen radio-sending station and adapted, when fully moved, to turn said shaft, each bar unit being composed of two flat bars, a push-button bar and an actuating bar positioned side by side and both having relatively wide bearing areas in the structure, the bars being interconnected by a spring and lever, the spring being stiff enough, without substantial change therein, to operate the actuating bar through the other bar to turn the shaft, the lever actuating the spring on the final movement of the push-button bar to move the actuating bar against fixed stops for the purpose described, and means for each unit completing the connection between the actuating bar and the shaft and rotatably adjustable on the shaft for determining the position which the tuning element will take on full movement of each bar unit.

17. The combination as set forth in claim 15, further characterized in that said driving connection comprises a four-to-one gear reduction whereby said shaft need be only turned 45° to get 180° of movement of the movable tuning element.

18. In a radio receiving set comprising a cabinet for holding parts of the set including a tuning device, a plurality of manually-operable members for causing actuation of the tuning device to tune the set to pre-selected frequencies, one frequency to each of said operable members, and means on the cabinet for holding the cabinet stationary while actuating said manually-operable members, said means and manually-operable members being within reach of and adapted to be simultaneously engaged by an operator's hand.

19. In a radio receiving set employing a manual apparatus for selecting and tuning the set to any one of a pre-selected frequency; said apparatus being operated by a plurality of push-button devices, one for each frequency, and means located on the set for assisting in pushing the buttons and at the same time opposing movement of the set by a pinching action of one hand of the operator.

20. In a radio receiving set having a tuning device, a manual apparatus for adjusting the electrical values of said device according to the requirement of predetermined frequencies which can be selected through said apparatus, said manual apparatus including a shaft operatively connected to the tuning device, an adjustable member carried by the shaft and a movable unit as herein defined for each frequency and having two main parts operatively connected, said connection comprising a lever pivoted to one of said parts and having a bent end extending into cooperative relation to the other part, and a resilient member disposed between the bent end of the lever and the second one of said main parts, the resilient member serving to transmit force from one of said parts to which a force is applied and which force remains active through said resilient member to move the other part of said unit to actuate said adjustable member and shaft to effect adjustment of the tuning device.

21. In a radio receiving set having a tuning device, a manual apparatus having a rotatable shaft for adjusting the electrical values of said tuning device according to the requirements of predetermined frequencies which can be selected through said apparatus; said apparatus including, a frame for supporting said shaft, a movable unit for each frequency and having parts supported by the frame and operatively connected by a resilient member whereby force applied to one of said parts will be transmitted through said member to another of said parts, means carried on the shaft to be engaged by said second-mentioned part for turning the shaft to a definite position, and means for simultaneously binding said second-mentioned part in its supports and against said means on the shaft engaged by it for the purpose described.

22. In a structure as set forth in claim 21, further characterized in that means are provided on the manual apparatus for locking the first-mentioned part in its fully actuated position to maintain the force of said resilient member on said second-mentioned part of the unit.

23. A manual apparatus for adjusting the electrical values of a tuning device of a radio receiver, including an element connected to said tuning device and carrying a plurality of members adjustable to different arcuate positions thereon, a plurality of movable units, one for each selected wave length, with means for moving said units, a part of each unit having means to engage its cooperating adjustable member on said element to act on the tuning device, immovable stop means for said unit part means for moving said unit part against said immovable stop means, and means for locking the said part in this stopped position.

24. A manual apparatus for adjusting the electrical values of a tuning device of a radio receiver as set forth in claim 23, further characterized in that each of said units is composed of two slidable bars, one operated by the other, through the medium of a relatively stiff spring, a push-button on one of said bars, while the other bar has means for engaging said adjustable member on said element as and for the purpose described.

JOHN H. TEAF.